United States Patent [19]

Carmillet et al.

[11] Patent Number: 4,890,711
[45] Date of Patent: Jan. 2, 1990

[54] CLUTCH CONTROL SYSTEM FOR AN AUTOMOBILE VEHICLE, AND A CLUTCH RELEASE BEARING THEREFOR

[75] Inventors: Roger Carmillet, Franklin, Mich.; Philippe Lassiaz, Boulogne, France

[73] Assignee: Valeo, Paris, France

[21] Appl. No.: 204,234

[22] Filed: Jun. 9, 1988

[30] Foreign Application Priority Data

Jun. 9, 1987 [FR] France ................................. 8708003

[51] Int. Cl.⁴ ........................ F16D 23/02; F16D 19/00
[52] U.S. Cl. .................................. 192/98; 192/110 B; 192/90
[58] Field of Search ..................... 192/0.032, 0.034, 54, 192/90, 98, 110 B

[56] References Cited

U.S. PATENT DOCUMENTS

| | | | |
|---|---|---|---|
| 1,062,840 | 5/1913 | Miller | 192/98 |
| 4,313,644 | 2/1982 | Dagiel | 192/110 B |
| 4,651,855 | 3/1987 | Grunberg | 192/90 |
| 4,660,701 | 4/1987 | Lassiaz et al. | 192/98 |
| 4,718,528 | 1/1988 | Caron et al. | 192/110 B |
| 4,750,596 | 6/1988 | Grunberg et al. | 192/90 |

OTHER PUBLICATIONS

Filderman R. and Grunberg P. "Electronic Actuator Eliminates Clutch Pedal." *Automotive Engineering*, (Oct. 1984) pp. 81–85.

*Primary Examiner*—Leslie A. Braun
*Assistant Examiner*—Nicholas Whitelaw
*Attorney, Agent, or Firm*—Charles E. Brown; Charles A. Brown

[57] ABSTRACT

The invention concerns a control system of the kind employing a clutch release bearing which, in response to a control device is adapted to act axially in a positive manner, in one direction, on a clutch release diaphram controlling the clutch. In accordance with the invention, the clutch release which is a double-acting clutch release bearing, being adapted to act axially equally well in both directions in order to absorb excess torque transmitted through the clutch.

6 Claims, 1 Drawing Sheet

CLUTCH CONTROL SYSTEM FOR AN AUTOMOBILE VEHICLE, AND A CLUTCH RELEASE BEARING THEREFOR

BACKGROUND OF THE INVENTION

The present invention relates generally to clutches, especially for automobile vehicles, and more specifically to their control systems.

As is well known, a clutch usually comprises a reaction plate which is intended to be keyed in rotation with a driving shaft, (in practice this is the output shaft, or crankshaft, of the engine of an automobile vehicle), a friction disc mounted to be axially movable relative to the reaction plate and keyed in rotation with a driven shaft, (in practice usually the input shaft of the gearbox) a pressure plate which is also mounted to be axially movable relative to the reaction plate and which is adapted to clamp the friction disc against the latter, a cover, which is axially fastened to and rotatable with the reaction plate, elastic clamping means which bear on the cover and which are adapted to urge the pressure plate towards the reaction plate in order to clamp the friction disc and thus engage the clutch, and clutch release means operated by a control system and adapted to release the friction disc to disengage the clutch.

As is also well known, the clutch control system usually incorporates a clutch release bearing which, in response to control means, is adapted to act axially in a positive manner in one direction on the clutch release means.

The term "positive" means an action which normally does not involve any elastic means, any displacement of the clutch release bearing in the direction concerned resulting in an equally large displacement of the clutch release means on which it acts.

If, in order to move into the disengaged configuration of the clutch, the clutch release bearing acts in the axial direction corresponding to an approach of the clutch release bearing towards the reaction plate, the clutch is of the kind known as a "pushed" clutch, while if for this movement into the disengaged position, the clutch release bearing moves axially further away from the reaction plate, it is known as a "pulled" clutch.

Whatever the arrangement, when a clutch is in the engaged configuration, with its friction disc clamped between the pressure plate and the reaction plate, there is usually, whilst the torque to be transmitted remains below a set nominal value, integration in rotation, without slipping, of the pressure plate and the reaction place, on the one hand, and the friction disc on the other hand.

However, during a transient phase, and this is the case particularly after a reversal of the torque as may be produced when, with the vehicle moving, the driver rapidly releases its accelerator and when the operation of the assembly consequently just as rapidly changes from a "pulling" mode in which the engine drives the vehicle, to a "retro" mode in which the vehicle tends to drive the engine, excess torques may be developed, that is to say torques with a value greater than the nominal value mentioned above.

In such a case, slipping normally occurs between the friction disc and the pressure and reaction plates which enclose it.

For various reasons and particularly to minimize the resultant wear of the friction disc, it is usual under these conditions to overdimension the clutch by a safety factor of e.g. about 1.3, such that it will be able to tolerate without slipping, a change of torque of a value higher than a predetermined nominal value selected to correspond to the maximum engine torque.

This arrangement which has been and still is satisfactory, at least for certain applications, has a double disadvantage.

First of all, it necessitates, as a matter of principle, overdimensioning of the clutch, to the inevitable detriment of its diametric bulk, its weight and its cost.

Moreover, whilst near the nominal value of the torque to be transmitted oscillations with relatively low amplitude are produced, corresponding to the unavoidable vibrations which may arise all along the kinematic chain, these oscillations do not induce slipping if they remain within the limits of the safety factor applied, and consequently the corresponding vibrations are integrally transmitted by the clutch to the detriment of the user's comfort.

The present invention has a construction which permits in a very simple manner these disadvantages to be minimized or even eliminated.

SUMMARY OF THE INVENTION

More specifically, the present invention proposes a clutch control system for an automobile vehicle, of the kind employing a clutch release bearing which, in response to control means is adapted to act axially positively in one direction on clutch release means controlling the clutch, which is characterised in that the clutch release bearing which it operates is a double acting clutch release bearing adapted to act axially positively equally well in both directions. The invention further comprises a double action clutch release bearing suitable for such a clutch control system.

Thus, according to the invention, it is possible to act on the clutch release means equally well in the direction corresponding to movement into the disengaged configuration, as in the opposite direction to this normal direction of functioning.

By acting in this way in the opposite direction on the clutch release means, an overcapacity for torque transmission is conferred.

In fact the force then exerted on the clutch release means operates in the same direction as that resulting from the elastic clamping means ensuring the engagement of the clutch and consequently reinforces the effects of the clamping means.

As a result of this overcapacity for torque transmission, it is possible to calibrate this clutch exactly to the nominal value of the torque to be transmitted, without application of any safety factor, even to a nominal value corresponding to a safety factor less than one, or to calibrate it to an intermediate nominal value by applying a safety factor less than the safety factor normally employed.

With an excess torque, it suffices in fact to act in the appropriate direction on the clutch release bearing.

Therefore, the conditions otherwise being equal, the clutch may have smaller dimensions, to the benefit of its diametric bulk, its weight and its cost.

Moreover, in the case of oscillations of the torque close to its nominal value, with an amplitude sufficiently small for them not to be assimilated into excess torques, the clutch which has thus been made as exactly as possible is advantageously subject to a degree of slipping which, without risk of significant wear of the friction disc, advantageously suppresses these oscillations with an appropriate benefit to the comfort of the user.

In accordance with a development of the invention, the same clutch can be fitted equally well to a vehicle the engine of which, according to the options given to the cutsomer, may be an engine with a turbocharger or a normally-aspirated engine.

As a result it suffices to provide a double acting clutch release bearing in accordance with the invention for the more powerful engine, while the basic components of the clutch remain the same, which is advantageous for an economic standardisation of these components.

It is particularly advantageous to employ the arrangement of the invention in the case where the clutch to be controlled is servo-operated, that is to say where the control means of the clutch release bearing comprise activating means adapted to act on it in response to a drive means.

In this case it suffices, that these drive means respond to the torque being transmitted by the clutch concerned, and that the activating means with which they are associated are adapted to act axially in both directions on the clutch release bearing, namely in a first direction corresponding to its usual direction of action, but also in the opposite direction when the torque being transmitted by the clutch exceeds a predetermined value.

DESCRIPTION OF THE PREFERRED EMBODIMENTS

These figures show, by way of example, the application of the invention to a servo-operated clutch, that is to say a clutch 10 the control system 11 of which, as detailed later, comprises drive means.

Figure 1:
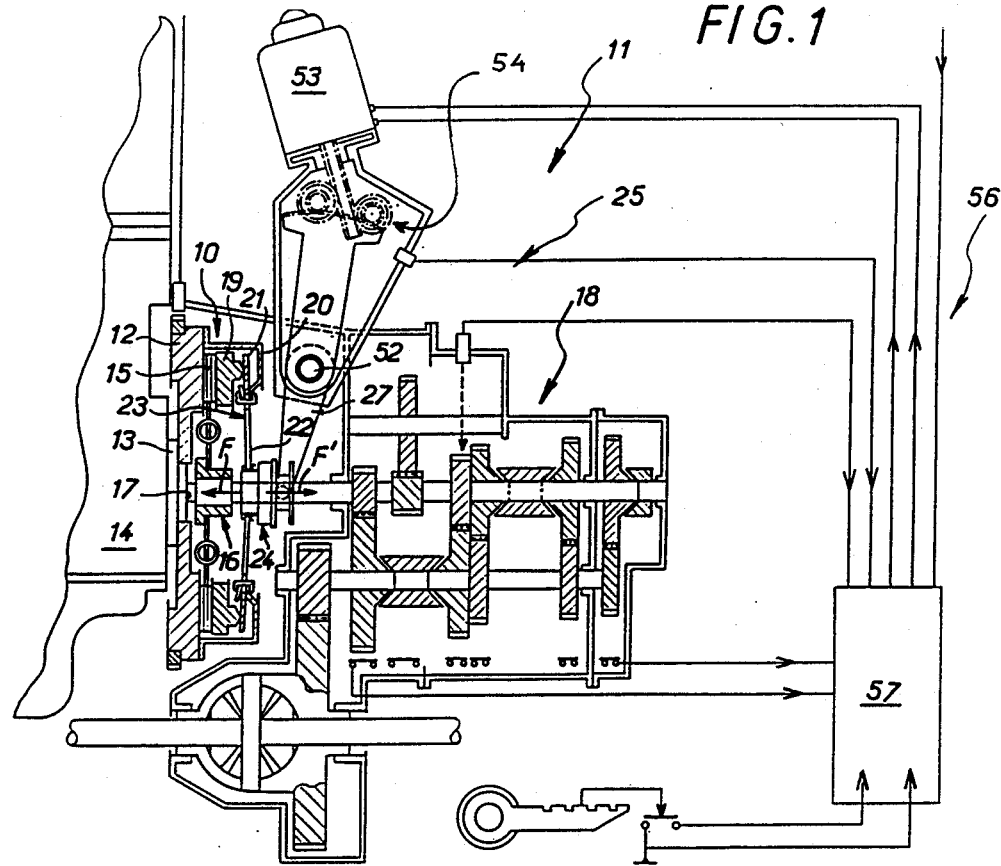
FIG. 1 is a block diagram of a clutch and its control system, fitted with an arrangement in accordance with the invention.

In known manner, and as shown schematically in FIG. 1, the clutch 10 comprises in axial succession, a reaction plate 12 which is keyed in rotation on a first shaft 13 (in practice a driving shaft which in the case of an automobile vehicle is the output shaft, or crankshaft, of the engine 14), a friction disc 15 which is mounted for axial movement relative to the reaction plate 12 and which, through a hub 16, is keyed in rotation with a second shaft 17, (which in the case of an automobile vehicle is in practice the input shaft to the gearbox 18), a pressure plate 19 which, is also mounted to be axially movable relative to the reaction plate 12, and is integral in rotation with this reaction plate 12 to clamp the friction disc 15 against the latter, and a cover 20, which itself is fastened to the reaction plate 12 both axially and in rotation. Disposed between the pressure plate 19 and the cover 20 is axially acting elastic means 21 which, bear on the cover 20 and which are adapted to urge the pressure plate 19 towards the reaction plate 12 in order to clamp the friction disc 15 and thus engage the clutch 10; clutch releasing means 22 are also provided adapted to ensure the release of the friction disc 15, to bring about the disengaged condition of the clutch 10.

In practice, the axially acting elastic clamping means 21 and the clutch release means 22 are part of one and the same annular part 23, commonly called a diaphragm, presenting a peripheral part, forming a Belleville washer which constitutes the axially acting elastic means 21, and a central part separated into radial fingers by slits, these radial fingers themselves constituting the said clutch release means 22.

These arrangements are well known in themselves and will not be described in more detail here.

In a manner equally well known in itself, the control system 11 associated with the clutch 10 operates a clutch release bearing 24 which, in response to control means 25 forming part of the associated control system 11, is adapted to act axially in a positive manner, in one direction, on the clutch release means 22 controlling the clutch 10.

In the embodiment shown, the clutch 10 is of the so-called "pushed" kind. The peripheral portion of the diaphragm 23 forming its elastic clamping means bears on the pressure plate 19 along a circumference with a greater diameter than that of the circumference with which it bears on the cover 20.

Figure 2:
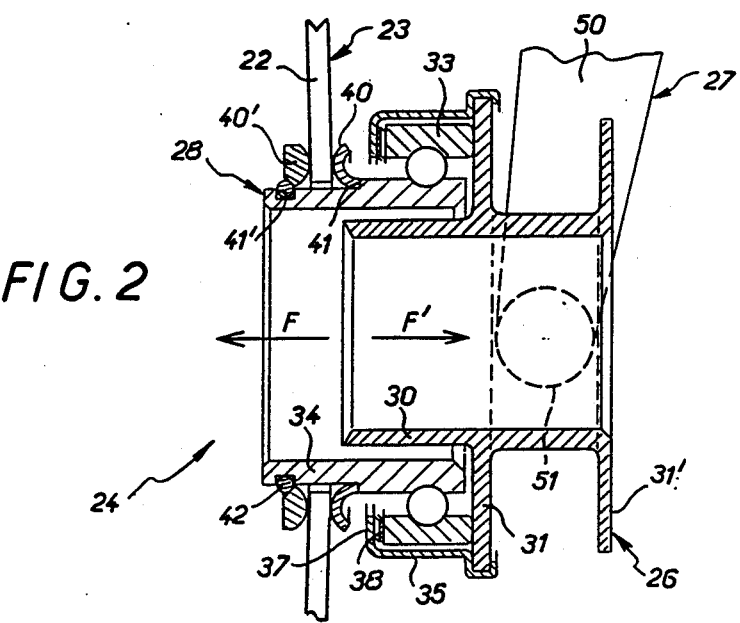
FIG. 2 is, on an enlarged scale, a view in axial cross-section of the clutch release bearing employed in this control system.

With the control system in the disengaged position of the clutch 10, the clutch release bearing 24 should then be displaced towards the pressure plate 12, in the direction of the arrow F in FIGS. 1 and 2.

In accordance with the invention, the clutch release bearing 24 is a double-acting clutch release bearing, that is to say a clutch release bearing adapted to act axially in a positive manner equally well in both directions.

In other words, this clutch release bearing 24 is adapted to act on the clutch release means 22 not only in the axial direction shown by the arrow F in FIGS. 1 and 2 which corresponds, in the case of a control system of a clutch 10 of the "pushed" kind, to its usual direction of intervention, but also in the opposite axial direction which, as shown schematically by the arrow F' in FIGS. 1 and 2, corresponds to that which would be its direction of intervention if this clutch 10 was not a clutch of the "pushed" kind, but of the "pulled" kind.

Overall, and in a known manner, the clutch release bearing 24 comprises an operating member 26, by which it is adapted to be subjected to activating means 27 forming part of its control means 25, and a drive member 28, which is connected axially to the operating member 26, and by which it is adapted to act axially in a positive manner, in one direction, that shown by the arrow F in FIGS. 1 and 2, on the clutch release means 22.

In practice, in the embodiment shown, the operating member 26 comprises, axially, a sleeve 30 by which it may, if desired, be engaged with any guiding element, for example the guide sleeve usually surrounding the input shaft 17 of the gearbox 18, and, transversely, an annular flange 31 on which the drive member 28 bears axially.

This drive member 28 comprises in the embodiment shown, a ball bearing, one of the races of which, and in the embodiment shown this is the outer race 33, is adapted to bear on the transverse flange 31 of the operating member 26, whilst the other race, which consequently is the inner race 34 in this embodiment, is adapted to act on the clutch release means 22.

The drive member 28 is connected axially to the operating member 26 by a generally annular casing 35 which at one of its edges is mounted on the transverse flange 31 of the operating member 26 and which, at its other end presents a bent over edge 37 bent towards the axis of the assembly to retain the drive member 28.

The embodiment showns a self-centring clutch release bearing with constant self-centring, an annular clearance being left free for the drive member 28 between the sleeve 30 of the operating member 26 and the casing 35, in such a way that, through the outer race 33 this drive member 28 has available, transversely at the contact surface with the flange 31, and within the limits of the annular clearance provided, a possibility of movement in any direction, and elastic means with an axial action, consisting for example, and as shown, of a corrugated elastic washer 38 of the kind sold commercially under the name "ONDUFLEX", which intervenes between this outer race 33 and the bent down edge 37 of the casing 35.

These arrangements are also well known in themselves and will not be described in more detail here.

In accordance with the invention, the drive member 28 of the clutch release bearing 24 is adapted to act axially in a positive manner as well in one direction as in the opposite direction.

In order to do this, this clutch release bearing 24 comprises, axially facing one another, whilst leaving a gap between them suitable for the engagement of the assembly on the clutch release means 22 of the clutch 10 to be controlled, two operating parts 40, 40' which each bear axially in a positive manner on respective transverse shoulders 41, 41' on the drive member 28.

With one of the operating parts, and in this case it is the operating part 40 corresponding to a "pushing" action in the direction of the arrow F, the axial bearing of this clutch release bearing 24 on the corresponding transverse shoulder 41 of the drive member 28 is made directly.

In practice, this part 40 is therefore disposed on the side of the diaphragm 23, of which the clutch release means 22 form part, which is away from the reaction plate 12, and the transverse shoulder 41 forms a simple step between two sections of different thickness of the inner race 34 of the ball bearing constituting the drive member 28.

In the embodiment shown, the operating part 40 is an annular part having a U-shaped profile transversely, with its outer convex face applied to the clutch release means 22, and the edge of its inner periphery, that is to say of its periphery with the smallest diameter applied to the corresponding transverse shoulder 41 of the drive member 28.

For example, this operating part 40 is pressed or forged sheet metal.

Equally, with the other operating part 40' which intervenes on that side of the diaphragm 23 of which the clutch release means 22 form part, and which faces the reaction plate 12, the axial application on the transverse shoulder 41' of the drive member 28 of the clutch release bearing 24 is made through the intermediary of a retaining ring 42, this transverse shoulder 41' being constituted by one of the flanks of a groove 43 which is provided for this purpose in the outer surface of the inner race 34, and with which this retaining ring 42 is engaged.

In the embodiment shown, the operating part 40' is a solid part and, for contact with the clutch release means 22, it presents a cross-section which is rounded transversely to present a convex profile, like the operating part 40 mentioned previously.

Thus, as is easily understood, the clutch release bearing 24 is engaged in the central opening of the diaphragm 23, of which the clutch release means 22 form part, by means of the portion of reduced diameter of the inner race 34 of the ball bearing constituting its drive member 28, up to the point of contact of operating part 40 with diaphragm 23, and, on the other side of this, the operating part 40', during installation, is engaged over the portion of reduced diameter until it too contacts the diaphragm 23, the retaining ring 42, which for example is a split retaining ring, then being located in place to ensure the retention in position of the assembly relative to the diaphragm 23.

The activating means 27 adapted to act on the clutch release bearing 24 are constituted by what it is usually convenient to call a clutch release fork.

This clutch release fork has two fingers 50 which are engaged substantially radially on the sleeve 30 of the operating member 26, being disposed respectively one on each side of the sleeve, and are adapted to act, in the direction shown by the arrow F in FIGS. 1 and 2, on the transverse flange 31 of this operating member 26.

In accordance with the invention, the operating member 26 comprises, parallel to this flange 31, and spaced from it, a second flange 31', on which the fingers 50 of the clutch release fork constituting the activating means 27 are also adapted to act, in this case in the direction of the arrow F', opposite to the direction F, and as shown in FIGS. 1 and 2.

These fingers 50 each respectively carry a spindle 51, directed towards each other, and located between the two flanges 31, 31'.

In practice, the clutch release fork thus constituting the activating means 27 of the clutch release bearing 24 is mounted to pivot around a central axis 52.

In the case of a servo-controlled clutch, its drive means 25 comprise a motor 53 which, through the intermediary of a transmission 54, and in accordance with arrangements of the kind described, for example, in French patent application No. 2.523.743, is adapted to produce its pivoting movement around its axis 52.

These arrangements are well known in themselves and will not be described in detail here. It will however be emphasised that advantage is taken of the fact that these arrangements are such as to enable control of pivoting in both directions of movement of this clutch release fork.

In accordance with arrangements likewise known in themselves, the clutch control system 11 comprises, finally, control means 56, in response to which the motor 53 is effectively adapted to operate the pivoting in one or other direction of the clutch release fork.

In practice, these control means 56 comprise, in combination with a gear lever 58 operated by the driver, a computer 57 which by means of sensors, receives measurements of a certain number of parameters, and which as a result controls the motor 53.

These arrangements are not dependent on the present invention and will not be described in detail here. It will suffice to indicate that amongst the sensors thus employed there are, in particular, two speed of rotation sensors 59, 60, the first responding to the speed of rotation of the output shaft 13 of the engine 14, and the second responding to the speed of rotation of the input shaft 17 of the gearbox 18.

In accordance with the invention, however, the control means 56 are responsive to the torque being transmitted by the clutch 10, this torque in practice being evaluated as a function of the difference between the speeds of rotation of the driving shaft and the driven shaft detected by the speed of rotation sensors 59, 60;

when the torque exceeds a predetermined value, they are adapted to control the motor 53 in a direction such that the activating means 27 act axially on the clutch release bearing 24 which, contrary to its usual direction of action, acts in the "pulled" manner on the clutch release means 22, in the direction of the arrow F' in FIGS. 1 and 2.

These activating means 27 are thereby adapted to act axially in one or other direction on the clutch release bearing 24, namely, in a first direction, which is its usual direction of action, and in the opposite direction when the torque being transmitted by the clutch 10 exceeds a predetermined value.

In this manner clutch 10 can absorb the corresponding excess torques.

In practice, the computer 57 should be able to distinguish between a voluntary intervention by the driver of the vehicle using the control at his disposal to change gear, which implies a disengagement of the clutch, and a call by a load on this clutch to transmit an excess torque, which obviously does not involve such a disengagement.

When, as indicated, this control is a gear change lever, this lever can then advantageously be a "split" lever of the kind, for example, described in French patent application No. 2.575.707, a position sensor being employed which detects the position of this lever.

Likewise, it is advantageous to employ a position sensor which detects the position of the clutch release bearing 24 which is to be controlled.

The present invention is not limited to the embodiment described but includes all variants within the scope of the appended claims.

What is claimed is:

1. A clutch release bearing for an automobile vehicle, said release bearing comprising an operating member adapted to be moved in a first direction and a second direction by activating means, and a drive member being axially connected to the operating member and through which the drive member is adapted to act axially positively in both the first and second directions on clutch release means of the clutch, said bearing having a pair of substantially rigid operating parts turned axially towards one another, with a gap between the pair of substantially rigid operating parts for engagement with the clutch release means of the clutch, said operating parts each bearing axially positively on a corresponding transverse shoulder provided on said drive member.

2. A clutch release bearing according to claim 1, wherein one of said substantially ridged operating parts is an annular part with an incurved transverse profile having an outer convex face applied to the clutch release means, and an inner peripheral edge which bears against one of said transverse shoulders of the drive member.

3. A clutch control system, for an automobile vehicle, said control system comprising a double-acting clutch release bearing which, in response to control means, is adapted to act axially positively in both axial directions on clutch release means for controlling engagement and disengagement of the clutch and for controlling torque transmitted by the clutch, said control means comprising activating means adapted to act on the bearing in response to drive means, said drive means being responsive to the torque transmitted by the clutch, and said activating means being adapted to act axially positively in both axial directions on the clutch release bearing, namely in a first direction corresponding to the bearing's usual direction of functioning when the torque transmitted by the clutch is under a predetermined value, and in a second direction when the torque transmitted by the clutch exceeds a predetermined value, the second direction being opposite the first direction.

4. The clutch control system according to claim 3, wherein said clutch release bearing has a pair of flanges, and said activating means acts axially positively in both axial directions upon said pair of flanges.

5. The clutch control system according to claim 4, wherein said clutch release bearing comprises a drive member and an operating member, said drive member and said operating member are axially connected to each other whereby said drive member and said operating member move in both axial directions.

6. The clutch control system according to claim 5, wherein said operating member has engagement means for engaging the clutch release means.

* * * * *